(12) United States Patent
Lee et al.

(10) Patent No.: US 8,504,539 B2
(45) Date of Patent: Aug. 6, 2013

(54) METHOD OF XML DOCUMENT MANAGEMENT TO SELECTIVELY CANCEL SPECIFIC PAST OPERATION AND SYSTEM USING THE SAME

(75) Inventors: Dong-Young Lee, Gyeonggi-Do (KR); Kang-Suk Huh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/258,292

(22) PCT Filed: Apr. 7, 2010

(86) PCT No.: PCT/KR2010/002122
§ 371 (c)(1),
(2), (4) Date: Sep. 21, 2011

(87) PCT Pub. No.: WO2010/120063
PCT Pub. Date: Oct. 21, 2010

(65) Prior Publication Data
US 2012/0023079 A1    Jan. 26, 2012

Related U.S. Application Data

(60) Provisional application No. 61/169,284, filed on Apr. 14, 2009.

(30) Foreign Application Priority Data

Jan. 25, 2010   (KR) .......................... 10-2010-0006658

(51) Int. Cl.
*G06F 17/30*    (2006.01)

(52) U.S. Cl.
USPC .......................................... 707/703; 709/203

(58) Field of Classification Search
USPC ....................... 707/703, 687; 709/203; 726/14
See application file for complete search history.

(56) References Cited

U.S. PATENT DOCUMENTS

| | | | |
|---|---|---|---|
| 7,076,488 B2 * | 7/2006 | Bollich | 1/1 |
| 7,945,536 B2 * | 5/2011 | Bao et al. | 707/674 |
| 7,953,696 B2 * | 5/2011 | Davis et al. | 707/608 |
| 2005/0033799 A1 | 2/2005 | Shin et al. | |
| 2006/0236387 A1 | 10/2006 | Ballinger et al. | |
| 2008/0046482 A1 | 2/2008 | Oh et al. | |

FOREIGN PATENT DOCUMENTS

| | | |
|---|---|---|
| KR | 10-2005-0016161 A | 2/2005 |
| KR | 10-2006-0081335 A | 7/2006 |
| KR | 10-2008-0015566 A | 2/2008 |

* cited by examiner

*Primary Examiner* — Monica Pyo
(74) *Attorney, Agent, or Firm* — Birch, Stewart, Kolasch & Birch, LLP

(57) ABSTRACT

Disclosed are an XML document management method for cancelling a specific past operation, and a system using the same. The method comprises identifying an original operation to be cancelled, identifying an XML resource to be cancelled, identifying a previous value of the XML resource to be cancelled, identifying a next value of the XML resource to be cancelled, configuring a cancel operation, and applying the cancel operation to the XML resource to be cancelled.

7 Claims, 3 Drawing Sheets

METHOD OF XML DOCUMENT MANAGEMENT TO SELECTIVELY CANCEL SPECIFIC PAST OPERATION AND SYSTEM USING THE SAME

This application is the National Phase of PCT/KR2010/002122 filed on Apr. 7, 2010 which claims priority under 35 U.S.C. 119(a) to Application No. 10-2010-0006658, filed on Jan. 25, 2010 in the Republic of Korea and under 35 U.S.C. 119(e) to U.S. Provisional Application No. 61/169,284 filed on Apr. 14, 2009, all of which are hereby expressly incorporated by reference into the present application.

TECHNICAL FIELD

The present invention relates to a document management method, and more particularly, to a document management method capable of selectively cancelling a specific operation executed in the past, and a system using the same.

BACKGROUND ART

An extensible markup language (XML) document management system refers to a system for accessing and managing an XML document stored in a server through a client. The system provides functions to create, retrieve, replace, and delete parts or all of the XML document.

As one of the XML document management system, there is an XML document management (XDM) system according to an open mobile alliance (OMA) standard.

The OMA XDM system includes an XDM client (XDMC), and XDM server (XDMS), and performs an XML document management by using an institution of electronics and telecommunication engineers (IETE) XML configuration access protocol (XCAP) (TETF RFC 4825).

The XCAP protocol is a protocol for enabling an operation with respect to a specific XML resource by using a hypertext transfer protocol/1.1 (HTTP/1.1). The XML resource includes an entire part of a specific XML document, a specific element of the XML document, or an attribute. And, the operation includes creation, retrieval, replacement, and deletion. That is, the XCAP protocol expresses a specific XML resource as an HTTP URI by using an XCAP uniform resource identifier (URI). And, the XCAP protocol requests retrieval, creation (change), and deletion with respect to the specific XML resource by using GET, PUT, DELETE methods of the HTTP/1.1.

The XCAP URI indicates an XML document stored in an XDM server, an element inside the XML document, or an attribute of the element. And, the XCAP URI may be expressed in the form of [XCAP RootURI]/[AUID]/users/[XUI].

The following table 1 explains the XCAP URI, and elements relating to the XCAP URI.

TABLE 1

| Elements | Contents |
| --- | --- |
| XCAP URI | An HTTP URI including an XCAP root, a document selector, a node selector separator, and a node selector. As a result, the [XCAP Root URI] selects a specific XML node. |
| XCAP Root URI | A URI indicating an XCAP root. This does not correspond to a substantial resource of an XCAP server even if it is a grammatically effective URI. The substantial resource is created by adding additional path information to the XCAP Root URI. |

TABLE 1-continued

| Elements | Contents |
| --- | --- |
| AUID(application unique ID) | A unique identifier inside a namespace of an application unique ID created from an XCAP specification. This AUID identifies an XCAP resource accessed by one application, from an XCAP resource accessed by another application. |
| XUI(XCAP User Identifier) | Character rows. This is valid as a path factor of an HTTP URI. This XUI is associated with each user who receives a service from an XCAP server. |
| XCAP root | A context including all of documents across all Application Usages and users that are managed by a server. |
| Document selector | A sequence of path segments separated from each other by "/". This identifies an XML document in a selected XCAP root. |
| node selector separator | A single path segment consisting of two tilde characters, "~~". This is used to separate a document selector from a node selector in an HTTP URI. |
| node selector | A sequence of path segments separated from each other by "/". This is used to identify an XML node (element or attribute) selected in a document. |

For instance, XCAP URI "http://xcap.example.com/address-book/users/sip:test@example.com/adbook1" indicates an "adbook1" document of a "test@example.com" user of an application recognized as an "address-book" of an "xcap.example.com" server.

When the "adbook1" document has contents shown in the following table 2, XCAP URI http://xcap.example.com/address-book/users/sip:test@example.com/addresses/address-book/entry/name" indicates an underlined <name> element of the following table 2.

TABLE 2

```
<?xml version="1.0" encoding="UTF-8"?>
    <address-book>
        <entry>
            <name>Jonathan Rosenberg</name>
            <email>jdrosen@dynamicsoft.com</email>
            <postal>
                <street paved="true">600 Lanidex Pl</street>
                <city>Parsippany</city>
                <state>NJ</state>
                <country>USA</country>
            </postal>
            <ietf-participant/>
        </entry>
            </address-book>
```

Hereinafter, examples of a main XCAP operation will be explained in more detail.

1. Element Retrieval

In order to retrieve the (first) "name" element in the table 2, a client sends an XCAP operation shown in the following table 3 to a server through an HTTP/1.1.

TABLE 3

GET http://xcap.example.com/address-book/users/petri/adbook1/address-book/entry/name HTTP/1.1

Here, the server sends a response shown in the following table 4 through the HTTP/1.1.

TABLE 4

Jonathan Rosenberg

2. Attribute Retrieval

In order to retrieve the "paved" attribute of the "name" element in the table 2, the client sends an XCAP operation shown in the following table 5 to the server.

TABLE 5

GET
http://xcap.example.com/address-book/users/petri/adbook1/address-book/entry/street/@paved HTTP/1.1

Here, the server sends a response shown in the following table 6.

Here, the server sends a response shown in the following table 6.

TABLE 6

HTTP/1.1 200 OK
Content-Type: application/xml-attribute-value
Content-Length: ...
True

3. Element Deletion

In order to retrieve the "email" element of the "name" element in the table 2, the client sends an XCAP operation shown in the following table 7 to the server.

TABLE 7

DELETE
http://xcap.example.com/address-book/users/petri/adbook1/address-book/entry/name/email HTTP/1.1

Here, the server sends a response shown in the following table 8.

Here, the server sends a response shown in the following table 8.

TABLE 8

HTTP/1.1 200 OK

As a result of the operation, the document of the table 2 is changed into that of the following table 9.

TABLE 9

```
<?xml version="1.0" encoding="UTF-8"?>
    <address-book>
        <entry>
            <name>Jonathan Rosenberg</name>
            <postal>
                    <street paved="true">600 Lanidex Pl</street>
                    <city>Parsippany</city>
                    <state>NJ</state>
                    <country>USA</country>
            </postal>
            <ietf-participant/>
        </entry>
            </address-book>
```

4. Attribute Deletion

In order to delete the "paved" attribute of the "street" element in the table 2, the client sends an XCAP operation shown in the following table 10 to the server.

TABLE 10

DELETE
http://xcap.example.com/address-book/users/petri/adbook1/address-book/entry/name/postal/street/@paved HTTP/1.1

Here, the server sends a response shown in the following table 11.

TABLE 11

HTTP/1.1 200 OK

As a result of the operation, the document of the table 2 is changed into that of the following table 12.

TABLE 12

```
<?xml version="1.0" encoding="UTF-8"?>
    <address-book>
        <entry>
            <name>Jonathan Rosenberg</name>
            <postal>
                    <street>600 Lanidex Pl</street>
                    <city>Parsippany</city>
                    <state>NJ</state>
                    <country>USA</country>
            </postal>
            <ietf-participant/>
        </entry>
            </address-book>
```

5. Element Creation

In order to add the "phone" element to the (sub) element of the "entry" element in the table 2, the client sends an XCAP operation shown in the following table 13 to the server.

TABLE 13

PUT
http://xcap.example.com/address-book/users/petri/adbook1/address-book/entry/phone HTTP/1.1
Content-Type: application/xml-fragment-body
    <phone>+19739525000</phone>

Here, the server sends a response shown in the following table 14.

TABLE 14

HTTP/1.1 200 OK

As a result of the operation, the document of the table 2 is changed into that of the following table 15.

TABLE 15

```
<?xml version="1.0" encoding="UTF-8"?>
    <address-book>
        <entry>
            <name>Jonathan Rosenberg</name>
            <phone>+19739525000</phone>
            <email>jdrosen@dynamicsoft.com</email>
            <postal>
                    <street paved="true">600 Lanidex Pl</street>
                    <city>Parsippany</city>
                    <state>NJ</state>
                    <country>USA</country>
            </postal>
            <ietf-participant/>
        </entry>
            </address-book>
```

6. Element Replacement

In order to change the "name" element in the table 2, the client sends an XCAP operation shown in the following table 16 to the server.

TABLE 16

PUT
http://xcap.example.com/address-book/users/petri/adbook1/address-book/
entry/name HTTP/1.1
Content-Type: application/xml-fragment-body
   <name>Jonathan D. Rosenberg</name>

Here, the server sends a response shown in the following table 17.

TABLE 17

HTTP/1.1 200 OK

As a result of the operation, the document of the table 2 is changed into that of the following table 18.

TABLE 18

```
<?xml version="1.0" encoding="UTF-8"?>
    <address-book>
        <entry>
            <name>Jonathan D. Rosenberg</name>
            <email>jdrosen@dynamicsoft.com</email>
            <postal>
                    <street paved="true">600 Lanidex Pl</street>
                    <city>Parsippany</city>
                    <state>NJ</state>
                    <country>USA</country>
            </postal>
            <ietf-participant/>
        </entry>
            </address-book>
```

As shown in the tables 13 and 16, one XCAP syntax may be a creation operation or a replacement operation according to contents of an XML document, an object of an XCAP operation. That is, when an XCAP URI in the XCAP operation indicates a specific XML resource, if the specific XML resource already exists in the XML document, the XCAP operation serves as a replacement operation with respect to the specific XML resource. And, if the specific XML resource does not exists in the XML document, the XCAP operation serves as a creation operation with respect to the specific XML resource.

Next, will be explained restriction conditions that can be applied in case of changing document contents in the XML document management system.

In the XML document management system, when the client requests, from the server, changes of contents of the XML document through the XCAP operation, the server firstly checks whether the request satisfies predetermined restriction conditions. Then, the server performs the request only when the request satisfies the predetermined restriction conditions. The predetermined conditions include an XML schema, an element of a specific part, the number of attributes, uniqueness, etc.

The XML schema is description about an XML document type. Generally, the XML schema is expressed as restrictions of a structure and contents of the XML document, as well as basic syntactical restrictions applied by the XML itself. Accordingly, the restrictions by the XML schema correspond to one of the conditions.

The number of a specific element or attribute needs to be limited, and to satisfy uniqueness. For instance, a sub element of a 'class' element, 'student' has a condition that its number should not exceed 50 per one class. Under a state that 50 'student' elements already exist, even if the client requests creation of one more 'student' element, the server does not perform the request because the request is not within the condition. As another example, a sub element of the 'class' element, 'teacher' has a condition that its number should be one per one class. Under a state that a 'teacher' elements already exist, even if the client requests creation of one more 'teacher' element, the server does not perform the request because the request is not within the condition.

Next, will be explained version management according to changes of document contents in the XML document management system.

Generally, when the client requests changes of an XML document through an XCAP from the server, the server checks whether a version of the client's XML document prior to the changes is consistent with a version of the server's corresponding XML document. When the two versions are consistent with each other as a result of the checks, the server performs the request.

For the checks, a header of an XCAP Response includes an Etag. The Etag is a version identifier with respect to a resource and provided by the server, and includes a kind of version number. The resource includes an XML document, and the Etag of the document is updated whenever contents of the document are changed.

Next, will be explained a method for requesting a plurality of operations at one time in the XML document management system.

Under an assumption that one request includes only a single operation, when a plurality operations are required to change many parts of a document, a plurality of requests including each operation have to be sequentially sent to the server and processed. In this case, a request according to IETF RFC 4825 is included.

An XML patch operation (IETF RFC 5261) is a standard with respect to an XML document type indicating contents for changing an XML document, an object of an XCAP operation. The XML patch operation document includes elements such as add, replace, remove, etc. The element indicates a method for changing another XML document. Since the XML patch operation document may include a plurality of elements, one XML patch operation document may include change contents corresponding to a plurality of XCAP operations. An example to express an XCAP operation by using an RFC 5261 standard includes a draft-ietf-simple-xcap-diff-09 standard.

The following table 19 explains terms relevant to the XML patch operation.

TABLE 19

| Terms | Contents |
| --- | --- |
| XCAP diff document | An XML document including a patch operation element, a name space declaration, and another document content change required to change an XML document, an object into a newly-patched XML document XML. |
| Patched XML document | An XML document obtained by applying one or more patch operations defined in an XML diff document to an XML document, an object. |
| patch operation | A single change, and a patch used to update an XML document, an object. |

TABLE 19-continued

| Terms | Contents |
|---|---|
| patch operation element | An XML element indicating a single patch operation. |

Example of XCAP Patch Operation

Hereinafter, an example of an XCAP patch operation will be explained. An XML document shown in the following table 20 corresponds to an object of an XCAP patch operation.

TABLE 20

```
<?xml version="1.0" encoding="UTF-8"?>
<doc>
    <note>This is a sample document</note>
</doc>
```

The XML patch operation can be implemented by using an XML diff document shown in the following table 21 with respect to the XML document of the table 20.

TABLE 21

```
<?xml version="1.0" encoding="UTF-8"?>
<diff>
    <add sel="doc"><foo id="ert4773">This is a new child</foo></add>
</diff>
```

The XML diff document includes one patch operation element, "<add sel="doc"><foo id="ert4773"> This is a new child</foo></add>". The patch operation element indicates searching for "doc" element in the XML document, and adding "<foo id="ert4773"> This is a new child</foo>" to the searched element. That is, the "foo" element is added as a sub element of the "doc" element. The "foo" element has a value of "This is a new child", and the "foo" element includes an "id" attribute having a value of "ert4773".

As a result of the operation, the XML document of the table 20 is changed into that of the following table 22.

TABLE 22

```
<?xml version="1.0" encoding="UTF-8"?>
<doc>
    <note>This is a sample document</note>
    <foo id="ert4773">This is a new child</foo>
</doc>
```

Next, the XML patch operation is implemented by using the XML diff document of the following table 23 with respect to the XML document of the table 22.

TABLE 23

```
<?xml version="1.0" encoding="UTF-8"?>
<diff>
    <add sel="doc/foo[@id='ert4773']" type="@user">Bob</add>
</diff>
```

The patch operation element of the table 23 indicates selecting one of sub elements of the "doc" element, "foo" elements in the XML document, the selected sub element having an attribute "id" of "ert4773", and adding an attribute "user" having a value of "Bob" to the "foo" elements.

As a result of the operation, the XML document of the table 22 is changed into that of the following table 24.

TABLE 24

```
<?xml version="1.0" encoding="UTF-8"?>
<doc>
    <note>This is a sample document</note>
    <foo id="ert4773" user="Bob">This is a new child</foo>
</doc>
```

The two XML diff documents of the tables 21 and 23 may be integrated as a single XML diff document including a patch operation element of each document. The single XML diff document is shown in the following table 25.

TABLE 25

```
<?xml version="1.0" encoding="UTF-8"?>
<diff>
    <add sel="doc"><foo id="ert4773">This is a new child</foo></add>
    <add sel="doc/foo[@id='ert4773']" type="@user">Bob</add>
</diff>
```

That is, if the XML diff document of the table 25 is applied to the XML document of the table 20, the XML document of the table 20 is changed into the XML document of the table 24.

As aforementioned, one XML diff document may include therein a plurality of patch operation elements indicating an operation. Accordingly, in the XML document management system the client may request a plurality of operations through the XML diff document from the server.

Next, will be explained a change record function and a change cancel function in the XML document management system.

As aforementioned, a user of the XML document management system may change contents of the XML document stored in the server through the client.

A change record viewing function is a function for storing changed contents of the XML document according to time orders, and thereby reading partial or all changes of the XML document. A change cancel function is a function for cancelling the past change contents.

In order to support the change cancel function, the XML document management system requires the followings. First of all, the XML document management system has to store the past change contents. Especially, in case of change and deletion operations, the XML document management system has to store not only the past operations, but also a previous value of an XML resource, an object of the operations. Furthermore, the XML document management system has to also store a designator for designating an operation to be cancelled. The designator may include an identifier (ID) of an operation, a sequential number of an operation, an Etag value before or after each operation, a time when a corresponding operation has been executed, etc.

The change cancel function is implemented to cancel all operations executed from a specific time point of the past to the present. The function is implemented in the same manner as a function for retrieving a document of which change is to be cancelled, into a specific version of the past. An OMA XDM 2.1 version supports the change cancel function in the XML document management system.

Examples of Change Records in XML Document Management System

For the aforementioned change records, an XML history document may be used.

Hereinafter, examples of the XML history document will be explained. If an XCAP operation of the following table 27 is applied to an XML document of the following table 26, the document is changed into that of the table 28. Here, an XML history document including contents of the following table 29 is created as records of the operation.

TABLE 26

```
<?xml version="1.0" encoding="UTF-8"?>
<doc>
    <foo a="1">Sample text 1</foo>
    <foo a="2">Sample text 2</foo>
</doc>
```

TABLE 27

```
PUT
http://xcap.example.com/AUID/users/sip:userA@example.com/index/~~/exa
mple1/foo%5b@a=1%5d HTTP/1.1
Content-Type:application/xml-fragment-body
    <foo a="1">This is A sample text 1</foo>
```

TABLE 28

```
<?xml version="1.0" encoding="UTF-8"?>
<doc>
    <foo a="1">This is a sample text 1</foo>
    <foo a="2">Sample text 2</foo>
</doc>
```

TABLE 29

```
<modify opid="aaa111" type="element" timestamp="2009061815300001"
sel="doc/foo[@a='1']">
    <requestor>sip:userA@example.com</requestor>
    <timestamp>2009061815300001</timestamp>
    <previous-etag>AABBCC</previous-etag>
    <etag>DDEEFF</etag>
    <previous-element>
        <foo a="1">Sample text 1</foo>
    </previous-element>
</operation>
```

Definitions of each XML element or attribute of the XML history document of the table 29 will be explained in the following table 30.

TABLE 30

| Modify | Indication that records are changed records. |
| Create | Indication that records are created records. |
| Opid | Identifier of an operation. |
| Type | Indication to which an XML resource to be operated belongs. This may have a value of "element" or "attribute", etc. |
| Timestamp | Time when an operation has occurred. |
| Sel | Indication a method for identifying an XML resource to be operated. |

TABLE 30-continued

| Requestor | Subject which has requested an operation. |
| previous-etag | Etag of an XML document to be operated before an operation. |
| Etag | Etag of an XML document to be operated after an operation. |
| previous-element | Value of an XML resource to be operated before an operation. |

Other examples of the XML history document will be explained. If an XCAP operation of the following table 31 is applied to an XML document of the following table 26, the document is changed into that of the table 32. Here, an XML history document including contents of the following table 33 is created as records of the operation.

TABLE 31

```
PUT
http://xcap.example.com/AUID/users/sip:user@example.com/index/~~/examp
le1/foo%5b@a=3%5d HTTP/1.1
Content-Type:application/xml-fragment-body
    <foo a="3">Sample text 3</foo>
```

TABLE 32

```
<create opid="aaa113" type="element" timestamp="2009061815300001"
sel="doc/foo[@a='3']">
    <requestor>sip:userA@example.com</requestor>
    <timestamp>2009061815300001</timestamp>
    <previous-etag>AABBCC</previous-etag>
    <etag>DDEEFF</etag>
</operation>
```

TABLE 33

```
<?xml version="1.0" encoding="UTF-8"?>
<doc>
    <foo a="1">Sample text 1</foo>
    <foo a="2">Sample text 2</foo>
    <foo a="3">Sample text 3</foo>
</doc>
```

As another example of the change cancel function, only a specific operation of the past operations may be selectively cancelled. However, when performing this type of cancel function, the following problems may occur.

Operations applied to a specific document may have dependencies on each other. Accordingly, if a specific operation is cancelled, executions of other operations dependent on the specific operation may be influenced.

FIG. 1 shows a problem occurring when a specific operation is cancelled, due to dependencies of operations on each other. More concretely, FIG. 1 shows a problem that operations 4 and 6 can not be executed as an operation 2 is cancelled, in a state that the operations 4 and 6 are dependent on the operation 2.

For instance, the operation 2 may serve to create an element E, and to initialize a value of an attribute A of the element E into 100. The operation 4 serves to change a value of the attribute A into 200. And, the operation 6 serves to delete the element E. In this case, the operation 4 (change operation) and the operation 6 (deletion operation) are dependent on the operation 2 (creation operation). That is, if the operation 2 is cancelled, executions of the operations 4 and 6 are made to be impossible.

As another example, under an assumption that the element E has one instance, the operation 1 serves to create an instance E1 of the element E, the operation 2 serves to delete the instance E1, and the operation 4 serves to create another instance E2 of the element E. And, the operation 6 serves to delete the E2. In this case, if the operation 2 for deleting the E1 is cancelled, the operation 4 can not be executed due to a condition that the element E should have one instance. Furthermore, the operation 6 can not be executed because the E2 does not exist.

DISCLOSURE OF INVENTION

Solution to Problem

Therefore, it is an object of the present invention to provide a method capable of selectively cancelling a specific operation among operations executed in the past by overcoming a conventional technical problem, dependencies of operations on each other.

More concretely, an object of the present invention is to provide an XML document management method capable of selectively cancelling a specific operation, and an XML document management system using the same.

To achieve these and other advantages and in accordance with the purpose of the present invention, as embodied and broadly described herein, there is provided an XML document management method for cancelling a specific past operation by a terminal, the method comprising: identifying an original operation to be cancelled; identifying an XML resource to be cancelled; identifying a previous value of the XML resource to be cancelled; identifying a next value of the XML resource to be cancelled; configuring a cancel operation; and applying the cancel operation to the XML resource to be cancelled, wherein the XML resource to be cancelled is an XML resource, an object of the original operation, the previous value is a current value of the XML resource to be cancelled, and the next value is a value of the XML resource to be cancelled before the original operation, wherein the cancel operation is executed so as to make the XML resource to be cancelled into the next value.

The method may further comprise determining whether execution of the cancel operation is against restriction conditions of the XML document.

According to another aspect of the present invention, there is provided an XML document management method for cancelling a specific past operation in an XML document management system, the method comprising: receiving a cancel request with respect to an operation to be cancelled by a server; executing a cancel operation by the server; and sending a response to the cancel operation to a sender of the cancel request by the server, wherein the cancel operation is based on an XML resource to be cancelled, a previous value of the XML resource, and a next value of the XML resource, the XML resource to be cancelled is an XML resource, an object of the original operation, the previous value is a current value of the XML resource to be cancelled, and the next value is a value of the XML resource to be cancelled before the original operation, wherein the cancel operation is executed so as to make the XML resource to be cancelled into the next value.

The method may further comprise configuring a cancel operation by the server. The cancel request may comprise a designator of the original operation, and the original operation may be identified by the designator.

The designator of the original operation included in the cancel request may be implemented in plurality in number. And, the server may configure and execute the cancel operation with respect to the original operation identified by each designator.

The cancel request may comprise the cancel operation.

The cancel operation included in the cancel request may be implemented in plurality in number. And, the server may execute each of the cancel operations.

The method may further comprise determining, by the server, whether execution of the cancel operation is against restriction conditions of the XML document to be cancelled.

The server may not execute the cancel operation if the previous value and the next value are equal to each other.

To achieve these and other advantages and in accordance with the purpose of the present invention, as embodied and broadly described herein, there is also provided an XML document management system server for cancelling a specific past operation, the system server comprising: a transceiver configured to perform data transmission/reception through a network; a controller configured to control the server; and a storage unit configured to store data required to operate the server, wherein the transceiver receives a cancel request from a client to send the cancel request to the controller, and receives a response to the cancel operation from the controller to send the response to the client, wherein the controller performs a cancel operation configuration, restriction condition checks, and execution of the cancel operation, makes a response to the cancel operation to send it to the transceiver, and inputs/outputs data required for the performances by being connected to the storage unit, wherein the storage unit stores data required to operate the server, wherein the cancel request is executed by designating an original operation to be cancelled, wherein the cancel operation is based on an XML resource to be cancelled, a previous value of the XML resource, and a next value of the XML resource, wherein the XML resource to be cancelled is an XML resource, an object of the original operation, the previous value is a current value of the XML resource to be cancelled, and the next value is a value of the XML resource to be cancelled before the original operation, wherein the cancel operation is executed so as to make the XML resource to be cancelled into the next value.

The storage unit may comprise a change record table and an XML document, and the change record table may comprise an operation, a designator of the operation, and a previous value of the XML resource to be operated.

The cancel request may comprise a plurality of the designators, and the controller may configure and execute the cancel operation with respect to the original operation to be cancelled, the cancel operation indicated by each designator.

The XML document management method for selectively cancelling a specific operation among operations executed in the past, and an XML document management system using the same according to the present invention may have the following advantages.

Firstly, a user may cancel only a specific operation among operations executed in the past with managing an XML document. This may provide flexibility and convenience to the user.

For instance, for an application to manage an address book by using the XML document system, a user may delete 100 existing addresses to register 200 new addresses, and then may wish to retrieve the 100 existing addresses. As aforementioned, the conventional XML document management system does not provide a function to cancel a specific operation, but provides only a function to retrieve an XML document having data of the address book stored therein to a previous version. Accordingly, the user of the system has to be provided with only one of the deleted 100 existing addresses and the 200 new addresses. The system of the present invention may provide flexibility and convenience to the user by overcoming the conventional problems.

MODE FOR THE INVENTION

Figure 1:
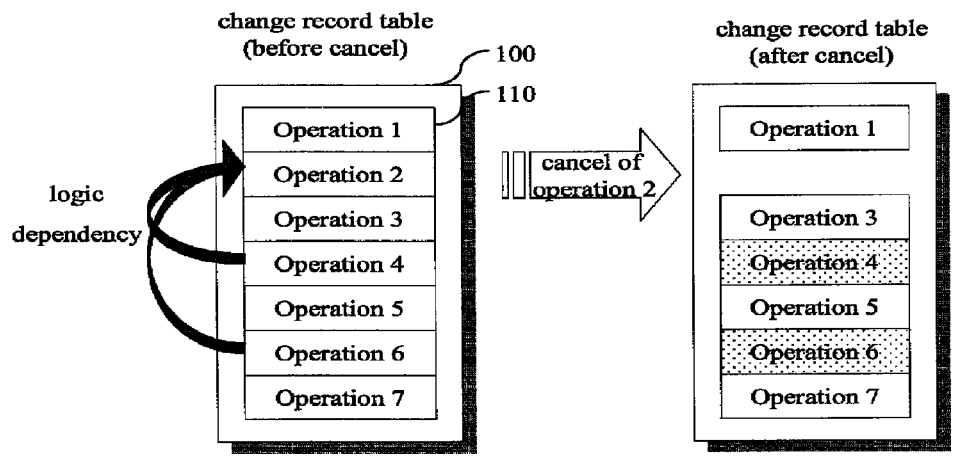
FIG. 1 shows a problem occurring when a specific operation is cancelled, due to dependencies of operations on each other.

Reference will now be made in detail to the preferred embodiments of the present invention, examples of which are illustrated in the accompanying drawings.

The present invention is applied to an XML document management method and an XML document management system using the same. However, the present invention is not limited to this, but may be applied to any methods and systems for managing a document or an object, the methods and systems to which technical features of the present invention may be applied.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

An XCAP operation may be classified into the following elements.

1. A fragment for designating an XML resource to be operated

2. A previous value of the object

3. A next value of the object

The above classification will be applied to exemplary XCP operations.

1. Operation to create an element E, and to initialize a value of an attribute A of the element E into 100

When applying an XCP operation of the following table 35 to an XML document of the following table 34, the XML document is changed into that of the table 36. Table 37 shows elements analyzed with respect to the operation.

TABLE 34

<?xml version="1.0" encoding="UTF-8"?>
<doc>
...
</doc>

"..." of the table 34 may be any XML resource irrelevant to the element E.

TABLE 35

PUT
http://xcap.example.com/documents/users/testuser/document/doc/E
HTTP/1.1
Content-Type: application/xml-fragment-body
<E A="100" />

TABLE 36

<?xml version="1.0" encoding="UTF-8"?>
<doc>
<E A="100" />
...
</doc>

TABLE 37

| | |
|---|---|
| Operation | Creating element E, and initializing value of attribute A of E into 100. |
| Object | Element E |
| Previous value | None |
| Next value | <E A="100" /> |

2. Operation to Change the Value of the Attribute A of the Element E into 200

When applying an XCP operation of the following table 38 to an XML document of the following table 36, the XML document is changed into that of the table 39. Table 40 shows elements analyzed with respect to the operation.

TABLE 38

PUT
http://xcap.example.com/documents/users/testuser/document/doc/E/@a HTTP/1.1
Content-Type: application/xml-fragment-body
    "200"

TABLE 39

```
<?xml version="1.0" encoding="UTF-8"?>
<doc>
    <E A="200" />
    ...
</doc>
```

TABLE 40

| Operation | Changing value of attribute A of element E into 200. |
|---|---|
| Object | Attribute A of element E |
| Previous value | 100 |
| Next value | 200 |

3. Operation to Delete the Element E

When applying an XCP operation of the following table 41 to the XML document of the following table 39, the XML document is changed into that of the table 42. Table 43 shows elements analyzed with respect to the operation.

TABLE 41

DELETE
http://xcap.example.com/documents/users/testuser/document/doc/E HTTP/1.1
    Content-Type: application/xml-fragment-body

TABLE 42

```
<?xml version="1.0" encoding="UTF-8"?>
<doc>
    ...
</doc>
```

TABLE 43

| Operation | Deleting element E. |
|---|---|
| Object | Element E |
| Previous value | <E A="200" /> |
| Next value | None |

As aforementioned with respect to the XCAP operation, the cancel operation of the present invention is defined as a new operation composed of the following elements. Each element is defined as the follows.

1. An object of the cancel operation is an object of an original operation.

2. A previous value of the cancel operation is a current value of the operation object. It should be noted that the previous value of the cancel operation is not a next value of the original operation.

3. A next value of the cancel operation is a previous value of the original operation.

When sequentially applying the XCAP operations of the tables 35, 38 and 41 to the XML document of the table 34, cancel operations with respect to the XCAP operations will be explained.

1. A cancel operation with respect to the XCAP operation of the table 38

In case of cancelling the XCAP operation of the table 38, a cancel operation with respect to the XCAP operation may be expressed as elements shown in the following table 44.

TABLE 44

| Operation | Cancelling XCAP operation of table 38 |
|---|---|
| Object | Attribute A of Element E |
| Previous value | None |
| Next value | 100 |

The previous value of the cancel operation is a current value of an object to be operated. Since the deletion operation shown in the table 41 has been already executed, there are no element E and attribute. Accordingly, there is no previous value.

The next value of the cancel operation is an object value of an operation prior to the cancel operation. A previous value of the attribute A, which is shown in the table 38 is 100. Accordingly, a next value is 100.

According to the elements shown in the table 44, the cancel operation serves to create an "element E, and to initialize a value of an attribute A of the E into 100. More concretely, for the cancel operation, the value of the attribute A has to be set to the 'next value'. And, the attribute A, and the element E which is a parent of the attribute A have to be created as a premise of the setting.

As a result of the operation, the XML document of the table 42 is changed into that of the following table 45.

TABLE 45

```
<?xml version="1.0" encoding="UTF-8"?>
<doc>
    <E A="100" />
    ...
</doc>
```

1. A Cancel Operation with Respect to the XCAP Operation of the Table 35

In case of cancelling the XCAP operation of the table 35, a cancel operation with respect to the XCAP operation may be expressed as elements shown in the following table 46.

TABLE 46

| Operation | Cancelling XCAP operation of table 35 |
|---|---|
| Object | Element E |
| Previous value | None |
| Next value | None |

The previous value of the cancel operation is a current value of an object to be operated. Since the deletion operation shown in the table 41 has been already executed, there is no element E. Accordingly, there is no previous value.

The next value of the cancel operation is an object value of an operation prior to the cancel operation. There is no element E prior to the operation shown in the table 38. Accordingly, there is no next value.

As shown in the table 44, the previous value and the next value of the element E are equal to each other. Accordingly, the cancel operation need not be executed.

Figure 2:
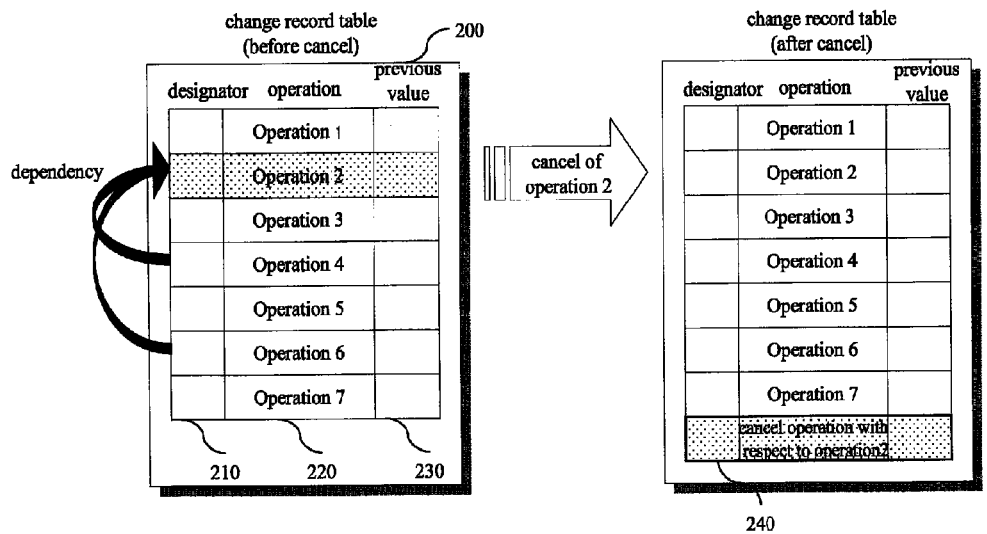
FIG. 2 is a view showing an example of a cancel operation according to one embodiment of the present invention.

FIG. 2 is a view showing an example of the cancel operation according to one embodiment of the present invention.

The XML document management system stores change records by using a change record table 200. More concretely, the change records include an operation 220 to be cancelled, a designator 210 for designating the operation, and a previous value 230 of an XML resource, an object of the operation.

Referring to FIG. 2, an operation to be cancelled is operation 2. Operations 4 and 6 are dependent on the operation 2, and the rest operations are irrespective of the operations 2, 4 and 6.

As shown in FIG. 2, the operation 2 is cancelled not by being removed from the change record table 200, but by undergoing a cancel operation 240 for cancelling the operation 2.

In this case, the operation 2 is not in a deleted state. Accordingly, even if the operations 4 and 6 are dependent on the operation 2, they are not influenced from the cancel operation. That is, even if there are operations dependent on the operation to be cancelled, the cancel operation of the present invention may be executed without influencing on the dependent operations.

Furthermore, the cancel operation of the present invention solves the conventional problems relating to restrictions of the number of the aforementioned elements or attributes, and uniqueness.

As one example, will be explained a case of applying the XCAP operations of the following tables 48, 50 and 52 to the XML document of the following table 47. Results of the applications of the respective XCAP operations are shown in the following tables 49, 51 and 53. Here, the element E has a restriction in uniqueness. That is, a sub element E of an element doc can have only one instance.

TABLE 47

```
<?xml version="1.0" encoding="UTF-8"?>
<doc>
  ...
</doc>
```

TABLE 48

```
PUT
http://xcap.example.com/documents/users/testuser/document/doc/E
HTTP/1.1
Content-Type: application/xml-fragment-body
    <E NO="1" />
```

The table 48 shows an XCAP operation to create a first instance of the element E.

TABLE 49

```
<?xml version="1.0" encoding="UTF-8"?>
<doc>
    <E NO="1" />
    ...
</doc>
```

TABLE 50

```
DELETE
http://xcap.example.com/documents/users/testuser/document/doc/E
HTTP/1.1
    Content-Type: application/xml-fragment-body
```

The table 50 shows an XCAP operation to delete a first instance of the element E.

TABLE 51

```
<?xml version="1.0" encoding="UTF-8"?>
<doc>
    ...
</doc>
```

TABLE 52

```
PUT
http://xcap.example.com/documents/users/testuser/document/doc/E
HTTP/1.1
Content-Type: application/xml-fragment-body
    <E NO="2" />
```

The table 52 shows an XCAP operation to create the element E. Due to the XCAP deletion operation of the table 50, the element doc does not include the element E as shown in the table 51. Accordingly, a second instance of the element E can be created because a condition of uniqueness is satisfied.

TABLE 53

```
<?xml version="1.0" encoding="UTF-8"?>
<doc>
    <E NO="2" />
    ...
</doc>
```

The cancel operation with respect to the XCAP operation of the table 50 is defined as the elements shown in the following table 54.

TABLE 54

| | |
|---|---|
| Operation | Cancelling XCAP operation of table 50 |
| Object | First instance of element E |
| Previous value | None |
| Next value | First instance of element E ("<E NO="1" />") |

The previous value of the cancel operation is a current value of an object to be operated. The first instance of the element E has been already deleted by the deletion operation of the table 50. Accordingly, there is no previous value.

The next value of the cancel operation is an object value of an operation prior to the cancel operation. The first instance of the element E prior to the operation shown in the table 50 has a value of "<E NO="1"/>". Accordingly, the next value is "<E NO="1"/>".

As shown in the table 54, the cancel operation serves to create the element E, "<E NO="1"/>". However, since the second instance of the element E already exists as shown in the table 53, it is against the aforementioned condition of uniqueness. Accordingly, the cancel operation has errors in a step of checking whether the restriction conditions have been satisfied, and is not executed.

Figure 3:
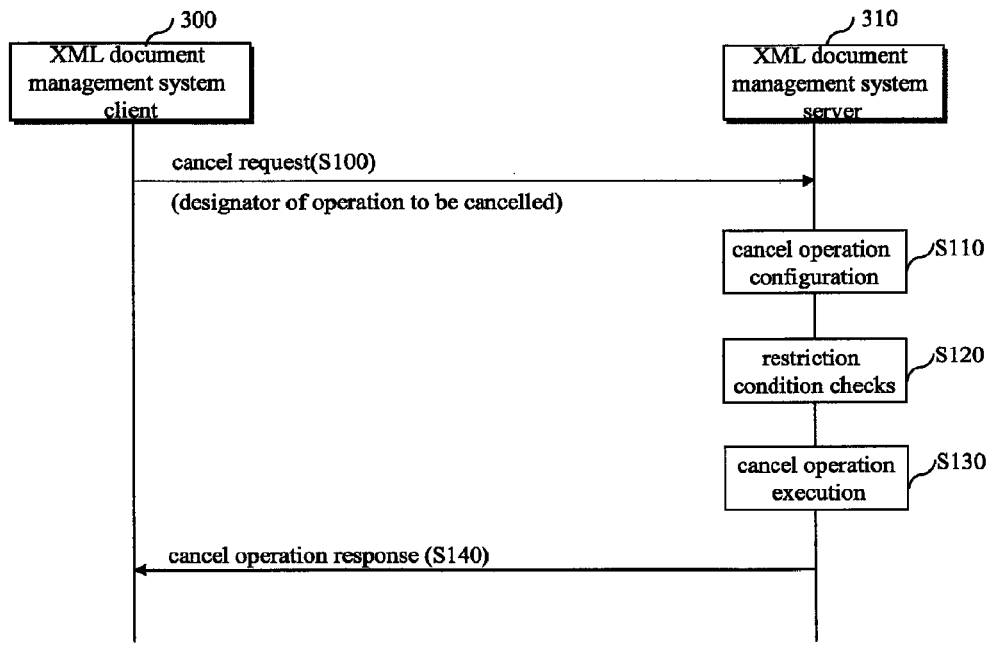
FIG. 3 is a view showing procedures of the cancel operation according to one embodiment of the present invention.

FIG. 3 is a view showing procedures of the cancel operation according to one embodiment of the present invention.

An XML document management system of FIG. 3 comprises an XML document management system client 300, and an XML document management system server 310. The client 300 may be an XDMC of an OMA, and the server 310 may be an XDMS of an OMA.

The client 300 sends a cancel request to the server 310. The cancel request includes a designator. The designator is a parameter for identifying an operation to be cancelled. The designator may include an identifier (ID) of an operation to be cancelled, a sequential number of an operation, an Etag value before or after each operation, a time when a corresponding operation has been executed, etc.

The server 310 having received the cancel request configures a cancel operation based on the cancel request according to the aforementioned embodiment (S110). For the configuration, required are an 'XML resource to be operated', and a 'next value' of the XML resource for setting a value of the XML resource. In order to manage change records by the operation, required is a 'previous value' of the XML resource.

After configuring the cancel operation, the server 310 checks whether execution of the cancel operation is against restriction conditions (S120).

If the execution of the cancel operation is not against restriction conditions as a result of the checks, the server 310 executes the configured cancel operation (S130). Then, the server 310 sends a result of the execution to the client 300 as a response (S140).

Executing the cancel operation includes applying the configured cancel operation to an XML document to be cancelled, and managing change records by the application.

On the other hand, if the execution of the cancel operation is against restriction conditions as a result of the checks, the server 310 does not execute the configured cancel operation, but sends an error message to the client 300 as a response (S140).

In the cancel request step (S100), a plurality of operations may be designated as operations to be cancelled. The request may be sent in the form of an XML patch operation document. If the operation to be cancelled requested by the server 310 is implemented in plurality in number, the server 310 configures a cancel operation with respect to each of the operations, and performs the configured cancel operations.

Sending the cancel request, and responding to the cancel operation may be performed based on an HTTP.

Figure 4:
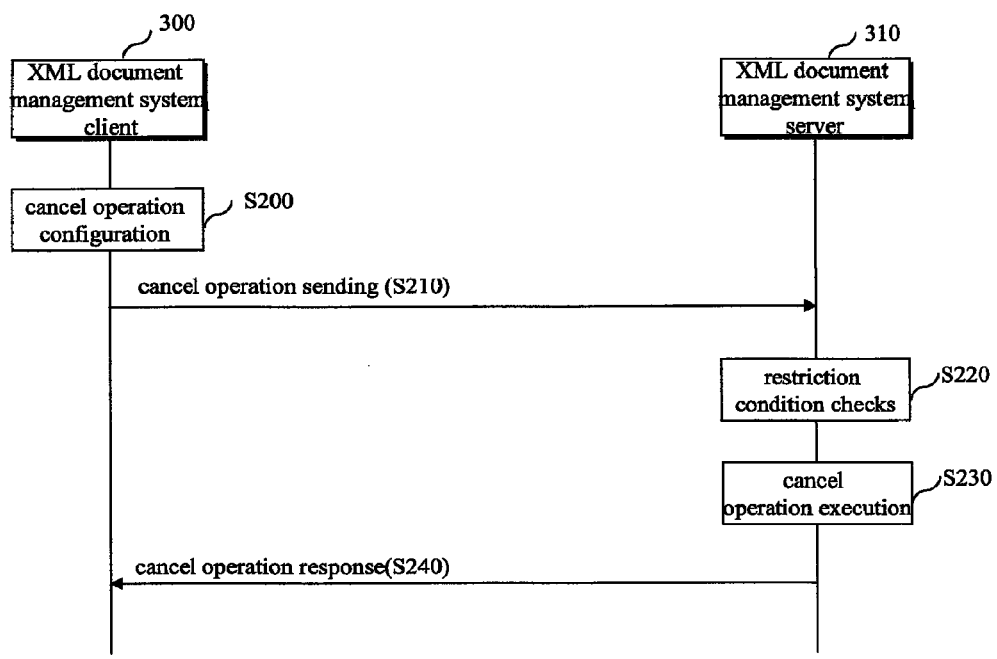
FIG. 4 is a view showing procedures of a cancel operation according to another embodiment of the present invention.

FIG. 4 is a view showing procedures of a cancel operation according to another embodiment of the present invention.

The cancel operation of FIG. 4 is different from the cancel operation of FIG. 3 in that it is configured by the client 300.

The client 300 configures a cancel operation according to an operation to be cancelled (S200). For the configuration, required are an 'XML resource to be operated', and a 'next value' of the XML resource for setting a value of the XML resource. In order to manage change records by the operation, required is a 'previous value' of the XML resource.

The client 300 may check whether executing the configured cancel operation is against restriction conditions. If the execution of the configured cancel operation is against restriction conditions as a result of the checks, the client 300 may stop the procedure.

The client 300 sends contents of the configured cancel operation to the server 310 (S210).

Then, the server 310 having received the cancel operation checks whether execution of the cancel operation is against restriction conditions (S220).

If the execution of the cancel operation is not against restriction conditions as a result of the checks, the server 310 executes the configured cancel operation (S230). Then, the server 310 sends a result of the execution to the client 300 as a response (S240). Executing the cancel operation includes applying the configured cancel operation to an XML document to be operated, and managing change records by the application.

If the execution of the configured cancel operation is against restriction conditions as a result of the checks, the server 310 does not execute the configured cancel operation, but sends an error to the client 300 as a result (S240).

When configuring the cancel operation (S200), a plurality of cancel operations may be configured to be sent to the server (S210). An XML patch operation document including the plurality of cancel operations may be used at the time of the sending (S210).

Sending the cancel request, and responding to the cancel operation may be performed based on an HTTP.

Figure 5:
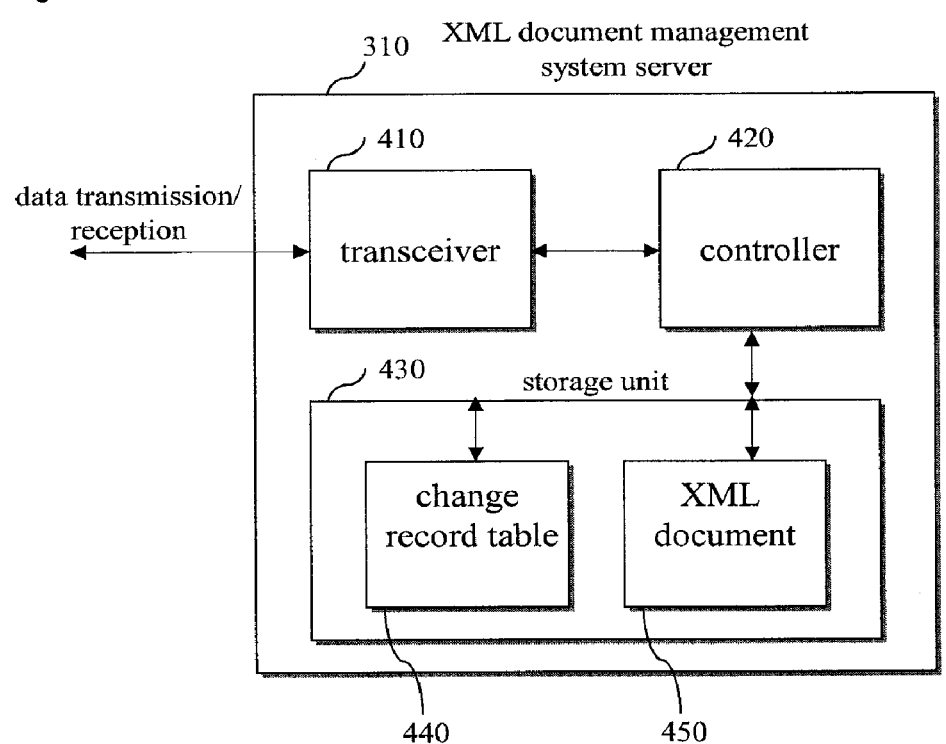
FIG. 5 is a view showing a configuration of an XML document system server according to one embodiment of the present invention.

FIG. 5 is a view showing a configuration of the XML document system server 310 according to one embodiment of the present invention.

The server 310 comprises a transceiver 410 configured to perform data transmission/reception through a network, a controller 420 configured to control the server 310, and a storage unit 430 configured to store data required to operate the server 310. The storage unit 430 includes a change record table 440, and an XML document 450.

The transceiver 410 receives a cancel request or a cancel operation from the client 300 (S100 or S210), and sends the cancel request or cancel operation to the controller 420. And, the transceiver 410 receives a response to the cancel operation from the controller 420, and sends it to the client 300 (S140 or S240).

The controller 420 performs the aforementioned cancel operation configuration (S110), restriction condition checks (S120 or S220), and cancel operation execution (S130 or S230), and makes a response to the cancel operation to send it to the transceiver 410. The controller 420 inputs/outputs data required for the performances by being connected to the storage unit 430.

The storage unit 430 stores data required to operate the server 310.

The server 310 and the client 32 may be implemented as computer systems or terminals, etc. independent from each other. Alternatively, the server 310 and the client 320 may be implemented as separate processes, threads, or modules, etc. operating on one hardware.

In addition, the above various embodiments may be implemented by using, computer software, hardware, or some combination thereof. For instance, the method of the present invention may be stored in the storage medium (e.g., internal memory, flash memory, hard disc, etc.), or may be implemented in codes or commands inside a software program that can be executed by a processor such as a microprocessor inside a mobile terminal.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An XML document management method for cancelling a specific past operation in an XML document management system, the method comprising:
   receiving a cancel request with respect to an operation to be cancelled by a server; executing a cancel operation by the server;

sending a response to the cancel operation to a sender of the cancel request by the server, wherein the cancel operation is based on an XML resource to be cancelled, a previous value of the XML resource, and a next value of the XML resource, the XML resource to be cancelled is an XML resource, an object of the original operation, the previous value is a current value of the XML resource to be cancelled, and the next value is a value of the XML resource to be cancelled before the original operation, wherein the cancel operation is executed so as to make the XML resource to be cancelled into the next value, wherein the cancel request comprises the cancel operation, and wherein the cancel operation included in the cancel request is implemented in plurality in number, and the server executes each of the cancel operations; and determining, by the server, whether the cancel operation is against restriction conditions of the XML resource to be cancelled.

2. The XML document management method of claim 1, further comprising:

configuring a cancel operation by the server, wherein the cancel request comprises a designator of the original operation, and the original operation is identified by the designator.

3. The XML document management method of claim 2, wherein the designator of the original operation included in the cancel request is implemented in plurality in number, and the server configures and executes the cancel operation with respect to the original operation identified by each designator.

4. The XML document management method of claim 1, wherein the server does not execute the cancel operation if the previous value and the next value are equal to each other.

5. An XML document management system server for cancelling a specific past operation, the system server comprising:

a transceiver configured to perform data transmission/reception through a network;

a controller configured to control the server; and a storage device configured to store data required to operate the server, wherein the transceiver receives a cancel request from a client to send the cancel request to the controller, and receives a response to the cancel operation from the controller to send the response to the client, wherein the controller performs a cancel operation configuration, restriction condition checks, and execution of the cancel operation, makes a response to the cancel operation to send it to the transceiver, and inputs/outputs data required for the performances by being connected to the storage device, wherein the storage device stores data required to operate the server, wherein the cancel request is executed by designating an original operation to be cancelled, wherein the cancel operation is based on an XML resource to be cancelled, a previous value of the XML resource, and a next value of the XML resource, wherein the XML resource to be cancelled is an XML resource, an object of the original operation, the previous value is a current value of the XML resource to be cancelled, and the next value is a value of the XML resource to be cancelled before the original operation, and wherein the cancel operation is executed so as to make the XML resource to be cancelled into the next value.

6. The XML document management system server of claim 5, wherein the storage device comprises a change record table and an XML document, and wherein the change record table comprises an operation, a designator of the operation, and a previous value of the XML resource to be operated.

7. The XML document management system server of claim 6, wherein the cancel request comprises a plurality of the designators, and wherein the controller configures and executes the cancel operation with respect to the original operation to be cancelled, the cancel operation indicated by each designator.

* * * * *